March 31, 1953     G. F. HAGGER     2,633,312
ENGINE MOUNT QUICK DISCONNECT

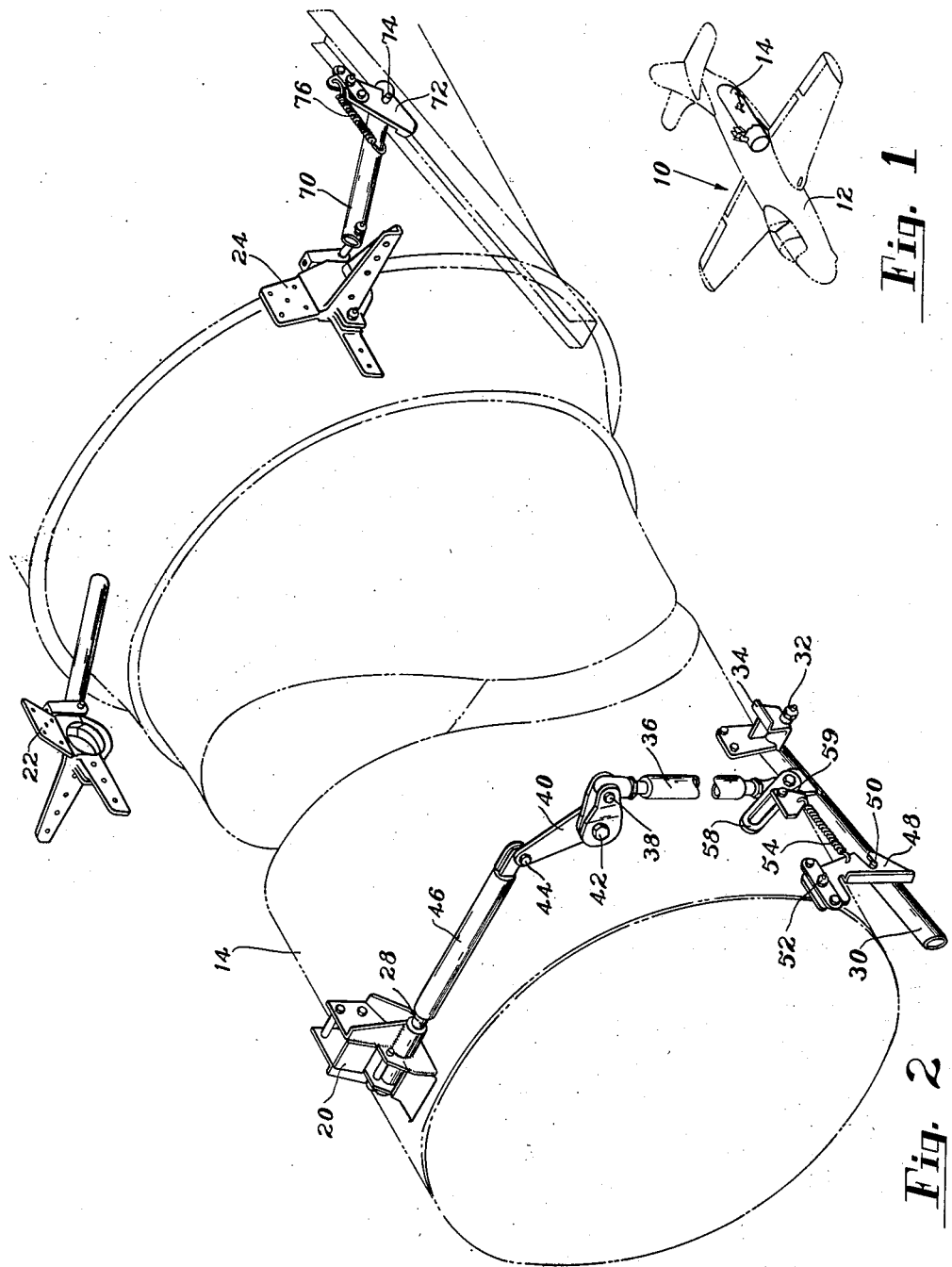

Filed June 23, 1948     3 Sheets-Sheet 2

INVENTOR.
George F. Hagger
BY
ATTORNEY

March 31, 1953  G. F. HAGGER  2,633,312
ENGINE MOUNT QUICK DISCONNECT
Filed June 23, 1948  3 Sheets-Sheet 3
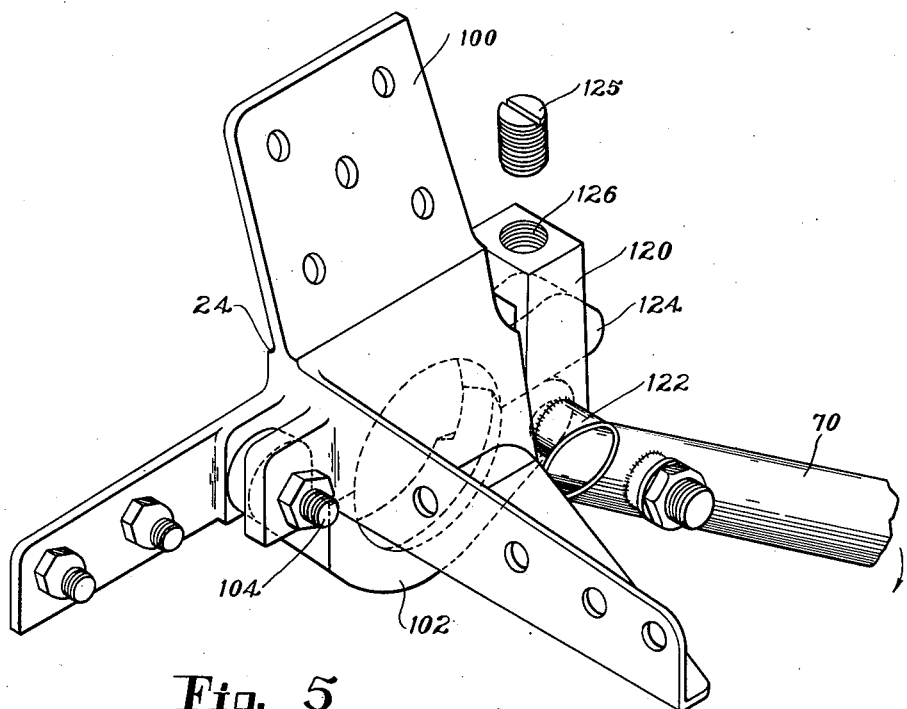
Fig. 5
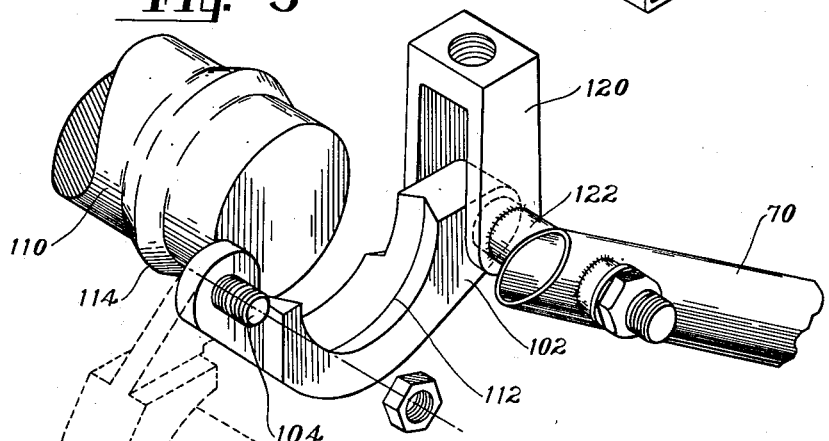
Fig. 6
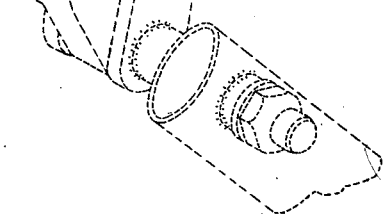
INVENTOR.
George F. Hagger
BY
ATTORNEY Patented Mar. 31, 1953

2,633,312

UNITED STATES PATENT OFFICE 2,633,312

ENGINE MOUNT QUICK DISCONNECT

George F. Hagger, Stratford, Conn., assignor to United Aircraft Corporation, East Hartford, Conn., a corporation of Delaware Application June 23, 1948, Serial No. 34,643

6 Claims. (Cl. 244—54)

This invention relates to improvements in aircraft and has particular reference to an improved mechanism for mounting a jet propulsion or similar power plant in aircraft of this type.

In high performance aircraft it becomes increasingly important to make the airplane compact and of a minimum size. In so doing it has been found expedient at times to bury jet or similar engines within close fitting compartments in the fuselage and to usually install the engines through an opening in the bottom of the compartment. As a result, ordinary engine mounts become inadequate since little or no clearance is made available for the manipulation of hand tools and the like to bolt or fasten the power unit to the airplane once it is lifted into place.

Therefore, it is an object of this invention to provide a mechanism for mounting a jet propulsion or similar engine in an aircraft in such a manner that the engine can be installed or removed rapidly and with ease and without the use of hand tools.

It is another object of this invention to provide a mechanism for suspending a jet propulsion engine, for example, in a belly compartment of an aircraft through an opening in the bottom of the compartment without necessarily having sufficient clearances or adequate accessibility to manipulate tools to fasten the engine after it is placed in position.

It is a further object of this invention to provide a three-point suspension system for mounting an engine in an aircraft wherein the engine closely fits the contour of the compartment in which it may be installed; the engine being capable of being mounted or dismounted with ease by one person.

More specifically, it is an object of this invention to provide a mechanism wherein a jet propulsion engine is fastened adjacent its top side and mounted within a close fitting compartment in the airplane by means of lever controls which are made accessible to aircraft maintenance personnel.

These and other objects will become readily apparent from the following detailed description of the drawings wherein a preferred embodiment of this invention has been illustrated.

In these drawings,

Fig. 1 is a perspective view of a jet propelled airplane having a jet propulsion engine installed according to this invention;

Fig. 2 is an enlarged perspective of the aircraft carried parts of the engine mounting mechanism with a partial view of the jet engine shown in phantom;

Fig. 5 is a detailed perspective view of one of the rear engine mounting brackets indicating the position of the airplane carried elements when locked; and Fig. 6 is a detailed perspective view of the lower movable portion of the mounting bracket shown in Fig. 5 with the open or unlocked position of the lower portion shown in dotted lines.

Figure 3:
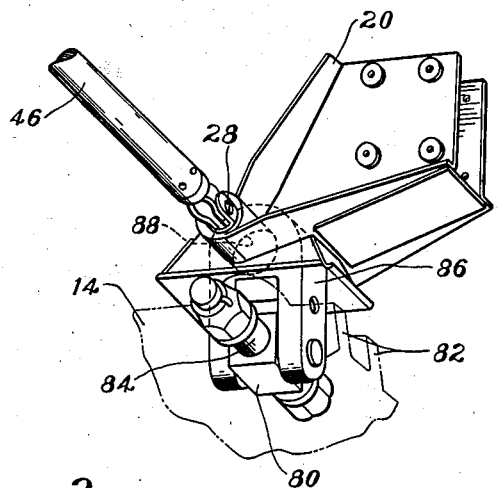
Fig. 3 is a detailed perspective showing the forward engine mounting bracket and including the universal joint carried by the engine.

Fig. 1 indicates a jet propelled aircraft generally indicated at 10 having a fuselage 12 and a jet propulsion engine 14 mounted in a compartment in the aft end of the fuselage 12. Inasmuch as the engine compartment provides but very little clearance for the engine 14, it is usually the practice to install the engine by raising it up through an opening or a doorway on the under side of the fuselage. Due to variations in design it may be found more expedient in some cases to install the power plant through an opening in the top of a fuselage. In order to properly fasten the engine to the aircraft once it is placed in position it is necessary that some mechanism be available by which maintenance personnel are provided with easily accessible means to lock the engine in position.

To this end (Fig. 2), a three-point suspension system is provided consisting of a forward mounting bracket 20 and two allochiral aft mounting brackets 22 and 24. The aft mounting brackets are positioned in a plane perpendicular to the longitudinal axis and spaced slightly from the top center line of the engine so that they will absorb any torque which may be created during operation of the engine. The forward mounting bracket is positioned so that it engages the engine 14 at its top and along a longitudinal center line. A slidable pin 28 permits rapid connection and disconnection of the front mounting bracket from the engine during installation or removal from the airplane. The operation of the pin 28 in connection with the mounting bracket 20 will be more fully described hereinafter.

Since it is obvious that the mounting bracket 20 will be out of reach and inaccessible when the engine is installed in a closely fitting compartment in the aircraft fuselage, it is necessary that some remote mechanism such as the control handle 30 be provided in an accessible place adjacent the opening of the engine compartment to operably secure the engine to the aircraft. The handle 30 is pivoted at 32 to the supporting member 34 which is rigidly attached to the aircraft structure. Intermediate its pivoted and free end the control handle 30 has attached thereto a connector 36 which is pivotally attached at 38 to one free end of the bell crank 40; the bell crank 40 being pivotally supported at 42 to the aircraft structure. The free end of the bell crank 40 has a pivot connection 44 to a push-pull rod 46 which carries at its opposite end the slidable pin 28 whose function is to connect or disconnect the mounting bracket 20.

A safety latch 48 normally engages a pin 50 on the handle 30 to prevent the handle 30 from moving when the engine is mounted and the pin 28 is engaged in the forward mounting bracket 20. The safety latch 48 is pivotally attached to the aircraft structure at 52 and is biased in an engaging position with the pin 50 on the handle 30 by a tension spring 54. A guide slot 58 is interconnected with the mechanism of the control handle 30 to positively insure aligned movement of the handle 30 during operation; the bolt 59 being fixed to the aircraft structure and being slidable within the slot 58.

It is then evident that if the safety latch 48 is disengaged from the pin 50, and the handle 30 is rotated counterclockwise the connector 36 will rotate the bell crank 40 thereby withdrawing the pin 28 from the mounting bracket 20 by means of the push-pull rod 46.

Each of the aft mounting brackets 22 and 24 are attached to the aircraft structure in such a position that they engage cooperating members on the periphery of the engine at points near the top but equally spaced away from the longitudinal center line of the engine 14. The mounting bracket 24 carries a pivotable control handle 70 which is locked in position by the safety latch 72 which engages the pin 74 on the handle 70 when the engine is mounted and locked in position. A spring 76 biases the latch 72 so that it engages the pin 74 until manually disengaged by the operator. The result of the operation of the handle 70 which can be rotated to effect disconnection of the mounting bracket 24 will be described hereinafter. The mounting bracket 22 contains mechanism (not shown herein) for locking its control handle in position in a manner identical to that provided for the mounting bracket 24.

Figure 4:
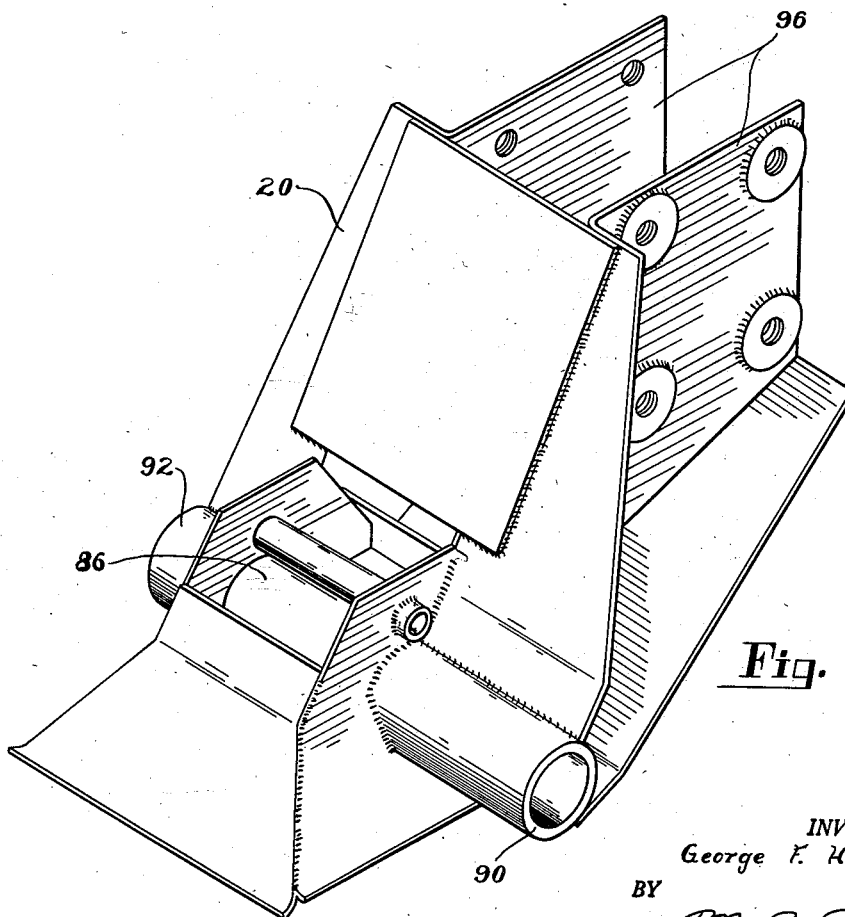
Fig. 4 is a detailed perspective view of the portion of the forward engine mounting bracket which is secured to the aircraft structure.

As better shown in Fig. 3, the forward mounting bracket 20 normally engages a universal joint 80 which is connected to the upstanding bifurcated adapter 82 on the engine 14 by means of the bolt 84. The universal joint 80 is provided so that thermal expansion or contraction of the engine 14 will not hinder the alignment of the cooperating elements of the forward mounting bracket 20 and will eliminate any undue concentration of stresses. An upright member 86 on the universal joint 80 carries a passage 88 which is normally aligned with the passages 90 and 92 (Fig. 4) in the mounting bracket 20 to permit a locking engagement to be effected between the universal 80 and the mounting bracket 20 by the passage of the pin 28 therethrough. Since the mounting bracket 20 is rigidly secured to the aircraft structure by rivets or bolts attached to the flanges 96 the engine 14 will be held firmly to the aircraft structure whenever the pin 28 is positioned through the passages 90 and 92 and the passage 88 which is located on the upright member 86 on the universal joint 80.

Thus when the push-pull rod 46 is moved by means of the lever mechanism connecting it to the control handle 30 the pin 28 will be removed from the cooperating passages 88, 90 and 92 thereby releasing the universal joint 80 from the mounting bracket 20 to disconnect the engine from the aircraft at this point.

Each of the aft engine mounting brackets (Fig. 5) consists of an upper portion 100 which is rigidly secured to the aircraft structure and a lower movable portion 102 pivotally connected to the upper portion 100 by the bolt 104. The upper portion 100 and the lower portion 102 form a split sleeve which normally engages a stud 110 (Fig. 6) rigidly secured on the periphery of the engine. The internal surface 112 of the sleeve, which is formed by the upper and lower portions 100 and 102, has a concave bevel which engages a convex annular rib 114 on the stud 110. When the concave surface 112 engages the convex rib 114 on the stud 110 positive and firm locking engagement is provided between the aircraft structure and the engine.

The previously described control handle 70 for the aft mounting bracket 24 carries at its upper pivoted end a bifurcated latching member 120 which is integrally connected thereto by the bolt 122. In its locked position the member 120 normally has its furcations straddling a protruding latch arm 124 which is an integral part of the upper portion 100 of the mounting bracket 24. A set screw 125 is installed in the threaded drilled passage 126 to provide an adjustment for insuring a friction bind between the latch member 120 and the latch arm 124. As seen better in Fig. 6 the bolt 122 which forms a rigid connection between the handle 70 and the latching member 120 also pivotally carries the lower portion 102 of the mounting bracket 24 so that once the latching member 120 is disengaged from the arm 124 the bolt 122, latch member 120 and the relatively free end of the lower bracket portion 102 can rotate in unison about the bolt 104.

In operation then when, after disengaging safety latch 72, the handle 70 for the mounting bracket 24 is rotated clockwise, the bifurcated latching member 120 will also rotate clockwise becoming disengaged from the arm 124 to a position where the entire lower portion 102 can be pivoted bodily about the bolt 104 into the dotted line position shown in Fig. 6 wherein the stud 110 is completely disengaged from the mounting bracket 24. It is then apparent that by rotation of the handle 70 connected to the mounting bracket 24 and the similar handle connected to the mounting bracket 22 on the other side of the engine, the engine 14 will be readily disconnected from the aircraft structure at its aft connections to rapidly permit its subsequent removal from the aircraft.

As a result of this invention a simple, rugged and compact mechanism has been provided whereby a jet propulsion or similar engine can be either mounted or dismounted from a close fitting compartment in an aircraft by one person without the use of any ordinary or special hand tools. It is to be understood, of course, that a bomb hoist or carriage is used in the dismounting or mounting operations by placing it in contact with the under side of the engine to lower the engine to the ground or raise it from the ground into the engine compartment.

Further as a result of this invention, a jet propulsion engine mounting mechanism has been provided for suspending the engine in a close fitting compartment in an aircraft wherein maintenance or installation personnel have locking controls readily available and accessible for securely fastening the engine in operating position.

Although only one embodiment of this invention has been shown it will be evident that various modifications and changes may be made in the arrangement of the various parts without departing from the scope of this novel concept.

I claim:

1. In an airplane having a fuselage and an engine compartment therein with an opening in the bottom of said fuselage to provide access to said compartment, means for mounting an engine within close dimensional tolerances in said compartment through said opening including a forward mounting bracket having a passage therethrough secured to said fuselage for supporting the engine at its top along a longitudinal center line, two allochiral aft mounting brackets secured to said fuselage for supporting the engine along its periphery at points spaced from said center line including an upper element and a lower element pivoted thereto, a forward fitting on said engine having a passage therethrough adapted to align with the passage in said forward mounting bracket, a slidable pin cooperating with said passages in said forward mounting bracket and said forward fitting to provide a connection therebetween, two aft fittings on said engine cooperating with said aft mounting brackets, latch mechanism on said lower element for releasably connecting each of said aft fittings between said upper and lower elements of each of said aft mounting brackets, and means for quickly locking and releasing said slidable pin connection and said latch mechanism including levers attached to the airplane near said opening and operatively connected to said slidable pin and said latch mechanism.

2. A quickly operable mechanism for suspending a jet propulsion engine within a confining belly compartment in an aircraft comprising a forward support member adapted to be attached to the aircraft having a pair of spaced apart segments having aligned passages therethrough, two allochiral aft support members adapted to be attached to the aircraft each having an upper stationary element and a lower cooperating element pivoted thereto, a forward universal attaching fitting fixed to said engine adjacent its top including an upstanding element having a passage therethrough adapted to be normally positioned in the space between said pair of segments in said forward support member, two aft fittings comprising studs adapted to be carried by said engine and projecting therefrom each having an annular convexity thereon, said upper stationary elements and said lower cooperating elements each having concavities for releasably engaging the convexities of said studs, slidable bolt mechanism cooperating with said passages for releasably connecting said forward fitting to said forward support member, detent means for normally maintaining said aft fittings locked to said aft support members, and means for manually dismounting said engine from said aircraft including lever mechanisms accessible from the bottom of said compartment and operatively connected to said bolt mechanism and said detent means for quickly releasing said fittings from said members.

3. A quickly operable mechanism for suspending a jet propulsion engine within a confining belly compartment in an aircraft comprising a forward support adapted to be attached to the aircraft supporting the engine at its top along a longitudinal center line, two allochiral aft support members adapted to be attached to the aircraft for supporting the engine along its periphery at points spaced from said center line each comprising an upper stationary element having a latch arm thereon and a lower cooperating element pivotally attached thereto, a forward universal attaching fitting adapted to be secured to said engine adjacent its top and adapted to engage said forward support, two aft stud fittings projecting from said engine and having annular convexities thereon, said upper stationary elements and said lower cooperating elements each having concavities for releasably engaging the convexities of said studs, latch means for normally maintaining said forward fitting locked to said forward support, latch mechanism for normally maintaining said upper stationary elements and said lower cooperating elements engaged with said studs including a pivotable latch member on said lower element cooperating with said latch arm on said stationary element, and lever means accessible from the bottom of said compartment and operatively connected to said latch means and said latch mechanism for disengaging said fittings from said supports.

4. In an airplane having a fuselage and a belly compartment therein, a quickly operable mechanism for suspending a jet propulsion engine within said compartment comprising a forward support member attached to the aircraft having a pair of spaced apart segments having aligned passages therethrough, two allochiral aft support members attached to the aircraft each having an upper stationary element having a latch arm thereon and a lower cooperating element pivoted thereto, a forward universal attaching fitting fixed to said engine adjacent its top including an upstanding element having a passage therethrough adapted to be normally positioned in the space between said pair of segments in said forward support member, two aft fittings comprising studs carried by said engine and projecting therefrom, slidable bolt mechanism cooperating with said passages for releasably connecting said forward fitting to said forward support, latch mechanism for normally maintaining said upper stationary elements and said lower cooperating elements engaged with said studs including a pivotable latch member on said lower element cooperating with said latch arm on said stationary element, and lever means accessible from the bottom of said compartment and operatively connected to said bolt mechanism and said latch mechanism for quickly releasing said fittings from said members.

5. In an airplane having a fuselage and an engine compartment therein with an opening in the bottom of said fuselage to provide access to said compartment, a quickly operable mechanism for suspending a jet propulsion engine within said compartment comprising a forward support member attached to the aircraft having a pair of spaced segments having aligned passages therethrough, two allochiral aft support members attached to the airplane, a forward universal attaching fitting fixed to said engine adjacent its top including an upstanding element having a passage therethrough adapted to be normally positioned between the spaced segments of said forward support member, two aft fittings comprising studs projecting from said engine, slidable bolt mechanism cooperating with said passages for releasably connecting said forward fitting to said forward support member, detent means for normally maintaining said aft fittings locked to said aft support members, and means for manually dismounting said engine from said aircraft including levers accessible from the bottom of said compartment and having operative connections to said bolt mechanism and said detent means for quickly releasing said fittings from said support members.

6. In combination with a jet propelled airplane having a jet propulsion engine, a three-point quickly detachable suspension system for mounting said engine to said airplane comprising, one forward mounting bracket having a passage therethrough and two allochiral aft mounting brackets secured to said airplane, said aft mounting brackets comprising an upper stationary element and a lower cooperating element pivotally connected therewith, a forward fitting having a pivotal connection to said engine and having a passage therethrough and adapted to cooperate with said forward mounting bracket, two studs secured to said engine and adapted to cooperate with said aft mounting brackets, a pin mounted on said forward mounting bracket and forming a sliding connection between said bracket and said forward fitting, releasable detent mechanism on said airplane for releasably locking said studs to said aft mounting brackets between said upper and lower elements, lever means attached to the airplane for releasing said pin connection between said forward mounting bracket and said forward fitting, lever means attached to said airplane for releasing said detent mechanism on each of said aft mounting brackets from said aft mounting brackets, and detent means on each of said lever means for locking said levers to the airplane structure when said engine is mounted.

GEORGE F. HAGGER.

REFERENCES CITED

The following references are of record in the file of this patent:

UNITED STATES PATENTS

| Number | Name | Date |
|---|---|---|
| 945,106 | Moodey | Jan. 4, 1910 |
| 1,237,889 | Fernandez | Aug. 21, 1917 |
| 1,514,410 | Verville | Mar. 4, 1924 |
| 1,588,619 | Roye et al. | June 15, 1926 |
| 1,754,717 | Hughens | Apr. 15, 1930 |
| 1,836,319 | Gehrung | Dec. 15, 1931 |
| 1,879,632 | O'Brien | Sept. 27, 1932 |
| 1,939,699 | Hofstetter | Dec. 19, 1933 |
| 2,400,248 | Morgan | May 14, 1946 |
| 2,461,422 | Jenny | Feb. 8, 1949 |
| 2,511,425 | Beauchamp | June 13, 1950 |
| 2,516,671 | Bowers | July 25, 1950 |

OTHER REFERENCES

Airacomet Janes "All the World's Aircraft," 1945–46, p. 204c.

Armstrong Janes "All the World's Aircraft," 1945–46, p. 3d.